(12) United States Patent
Maeda et al.

(10) Patent No.: US 8,014,139 B2
(45) Date of Patent: Sep. 6, 2011

(54) COMPACT AND LIGHT COMPUTER CASING STRUCTURE

(75) Inventors: Kazuhiko Maeda, Yokohama (JP); Hiroaki Agata, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 260 days.

(21) Appl. No.: 12/250,101

(22) Filed: Oct. 13, 2008

(65) Prior Publication Data

US 2009/0103257 A1 Apr. 23, 2009

(30) Foreign Application Priority Data

Oct. 18, 2007 (JP) ................................. 2007-271779

(51) Int. Cl.
*G06F 1/16* (2006.01)

(52) U.S. Cl. .............. 361/679.27; 361/679.26; 248/917; 248/918

(58) Field of Classification Search .............. 361/679.27
See application file for complete search history.

(56) References Cited

U.S. PATENT DOCUMENTS

| | | | | |
|---|---|---|---|---|
| 5,168,429 A * | 12/1992 | Hosoi | ...................... | 361/679.09 |
| 5,255,154 A * | 10/1993 | Hosoi et al. | .............. | 361/679.27 |
| 5,701,230 A * | 12/1997 | Liang et al. | .............. | 361/679.27 |
| 5,905,550 A * | 5/1999 | Ohgami et al. | .................. | 349/58 |
| 6,115,239 A * | 9/2000 | Kim | ......................... | 361/679.57 |
| 6,262,824 B1 * | 7/2001 | Sasaki et al. | ................... | 398/115 |
| 6,477,871 B1 * | 11/2002 | Shaw et al. | ........................ | 70/58 |
| 6,791,628 B1 * | 9/2004 | Sellers | .......................... | 348/744 |
| 6,798,648 B2 * | 9/2004 | Sasaki et al. | ............. | 361/679.27 |
| 6,853,336 B2 * | 2/2005 | Asano et al. | .................. | 343/702 |
| 6,870,732 B2 * | 3/2005 | Huang et al. | .............. | 361/679.17 |
| 7,016,184 B1 * | 3/2006 | Oneyama et al. | ........ | 361/679.27 |
| 7,349,199 B2 * | 3/2008 | Tracy et al. | .............. | 361/679.27 |
| 7,609,514 B2 * | 10/2009 | Doczy et al. | ............. | 361/679.58 |
| 2001/0009498 A1 * | 7/2001 | Oross et al. | .................... | 361/681 |
| 2001/0015885 A1 * | 8/2001 | Nakajima et al. | ............ | 361/686 |
| 2002/0101140 A1 * | 8/2002 | Sormunen et al. | ......... | 312/223.1 |
| 2002/0172002 A1 * | 11/2002 | Sasaki et al. | .................. | 361/683 |
| 2006/0133019 A1 * | 6/2006 | Yamazaki et al. | ............ | 361/683 |
| 2006/0193109 A1 * | 8/2006 | Bander et al. | .................. | 361/681 |
| 2007/0115621 A1 * | 5/2007 | Guillen | .......................... | 361/683 |
| 2008/0174943 A1 * | 7/2008 | Hirasawa et al. | ............. | 361/681 |

FOREIGN PATENT DOCUMENTS

| | | |
|---|---|---|
| JP | H08-076886 | 3/1996 |
| JP | 2000-066176 | 3/2000 |
| JP | 2001-134195 | 5/2001 |
| JP | 2005-017201 | 3/2005 |
| JP | H09-062400 | 3/2007 |

* cited by examiner

*Primary Examiner* — Lisa Lea-Edmonds
*Assistant Examiner* — Anthony Q Edwards
(74) *Attorney, Agent, or Firm* — Ference & Associates LLC

(57) ABSTRACT

A protective casing structure of an electronic apparatus capable of keeping the apparatus compact and light is provided. A display-side block includes a display module and a display casing. The display casing is provided with frame edges at a periphery thereof, with projections formed on the frame edges. Grooves engaging with the projections are formed in a system casing. When the display-side block is closed, the projections engage with the grooves to increase rigidity against pressing from the outside in the closed state. The casing structure thereby increases the protective capability of the display module while keeping the apparatus compact and light.

20 Claims, 9 Drawing Sheets

COMPACT AND LIGHT COMPUTER CASING STRUCTURE

CLAIM FOR PRIORITY

This application claims priority from Japanese Application No. 2007-271779 filed on Oct. 18, 2007, and which is fully incorporated by reference as if fully set forth herein.

FIELD OF THE INVENTION

The present invention relates to a casing structure that holds a display module of an information apparatus.

BACKGROUND OF THE INVENTION

In recent years, it has been demanded that a notebook-size personal computer (hereinafter referred to as the notebook-size PC) be further compact and light. The notebook-size PC is carried under a user's arm, received together with documents and the like in a bag, or provided with the documents laid thereon on a desk. Therefore, a casing of the notebook-size PC is required to have such a mechanical strength as to protect inner (e.g. electronic) components against a pressing force from the outside. In particular, the center of a display casing accommodating a liquid crystal display is brittle and needs protection. Therefore, when the center of the closed display casing is pressed, an influence such as strain is left in a screen displayed in the liquid crystal display. Moreover, the center of the display casing easily comes in contact with a keyboard or a portion around the keyboard, and is easily damaged. Therefore, in particular, a sufficient strength against the pressing force applied to the center of the casing needs to be secured.

For example, there are the following conventional technologies concerning a reinforcing structure concerned with display. Japanese Patent Application Laid-Open No. 8-76886 teaches a technology in which a liquid crystal display casing is fixed together with a lid casing attachment portion of a lid casing so as to be freely opened and closed through hinges, and the lid casing is reinforced by a reinforcing plate subjected to squeeze processing. Japanese Patent Application Laid-Open No. 9-62400 teaches a technology in which a brace-like rhombic lattice rib is arranged between the back surface cover of the notebook-size PC and the liquid crystal display to increase the strength of the back surface cover. The back surface cover accommodates the liquid crystal display and a fluorescent tube, and is connected to an input section via hinges. Japanese Patent Application Laid-Open No. 2001-134195 teaches a technology in which a laminated panel holding a honeycomb core made of an aluminum alloy between aluminum alloy plates is provided on the back surface, to improve earthquake-proof properties of a plasma display device.

These and other conventional solutions have significant shortcomings and have not sufficiently addressed the need for a compact and light casing that provides the necessary (e.g. protective) functions.

SUMMARY OF THE INVENTION

In accordance with one presently preferred embodiment of the present invention, the principle of the present invention as broadly contemplated lies in providing a casing structure of an electronic apparatus capable of making the apparatus compact and light. Furthermore, according to the present invention, there is provided a casing structure capable of protecting a display module against a pressing force from the outside while making the apparatus compact and light. Furthermore, according to the present invention, there is provided a compact and light portable computer.

In summary, one aspect of the invention provides an apparatus comprising: a display casing having at least one integral projection formed on an edge of said display casing; and a system casing having at least one integral groove therein that engages with the at least one integral projection of the display casing upon said display casing being placed in a closed position.

An additional aspect of the invention provides an apparatus comprising: a system casing having at least one integral projection formed on an edge of the system casing; and a display casing having at least one integral groove therein that engages with the at least one integral projection of the system casing upon said display casing being placed in a closed position.

Furthermore, another aspect of the invention provides an apparatus comprising: a display casing that accommodates a display; wherein the display casing has at least one of at least one integral projection or at least one integral groove therein.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

It will be readily understood that the components of the present invention, as generally described and illustrated in the Figures herein, may be arranged and designed in a wide variety of different configurations. Thus, the following more detailed description of the embodiments of the apparatus of the present invention, as represented in the figures, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices that are consistent with the invention as claimed herein. The detailed description of the invention will briefly review some conventional arrangements and problems associated therewith and highlight some features of the instant invention (providing solutions to these problems). The description will then proceed with a more detailed description of preferred embodiments according to the present invention.

Figure 6A:
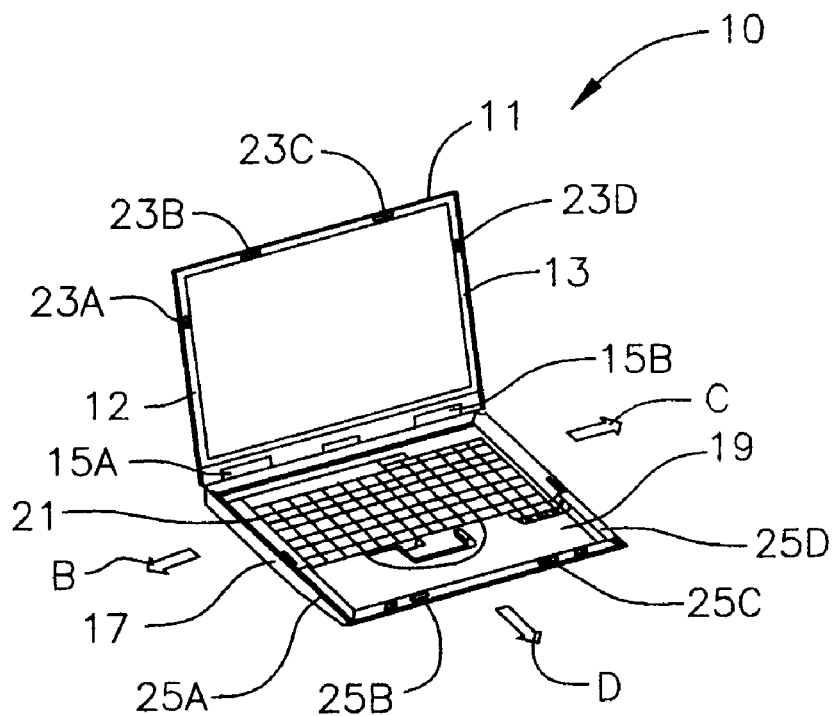
FIGS. 6A and 6B are explanatory views showing a casing structure of a conventional notebook-size PC.
Figure 6B:
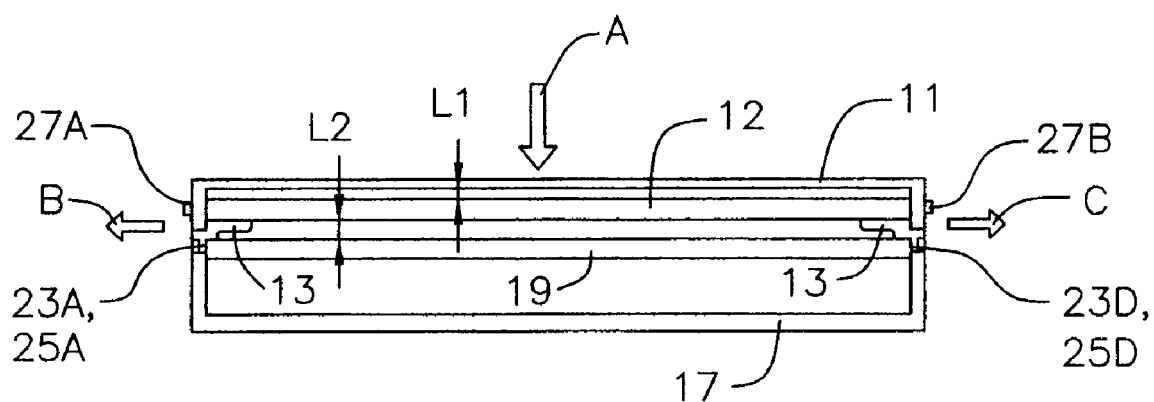

Referring now to FIG. 6A, a perspective view showing the outer shape of a conventional notebook-size PC is shown. A notebook-size PC 10 is entirely divided into a display-side block and a system-side block. The display-side block is attached to the system-side block so as to be freely opened and closed. FIG. 6B is a diagram schematically showing a section of the display-side block when closed. The display-side block includes a display casing 11, a display module 12 and a display frame edge 13. The display casing 11 is made of a metal such as an aluminum alloy or a magnesium alloy, is formed into a thin-plate box-like shape, and accommodates and holds therein the display module 12.

The display module 12 is constituted of a liquid crystal element, a polarization filter, a back light, a driving unit and the like, and is attached to the side surface of the display casing 11 with screws 27a, 27b. The display module 12 is connected to a video card received in a system casing 17 via cables passing through hinges 15a, 15b. A gap L1 is secured between the inner surface of the display casing 11 and the back surface of the display module 12. When the display casing 11 is closed, a space L2 is secured between the surface of the display module 12 and a keyboard frame edge 19.

In manufacturing steps of the notebook-size PC 10, the display module 12 is fixed to the display casing 11, and then the display frame edge 13 is fixed to the display casing 11 with the screws so as to cover a gap between the display module 12 and the inner surface of the side wall of the display casing 11. The display frame edge 13 is formed of a plastic material. The display frame edge 13 is provided with projections 23a, 23b, 23c and 23d.

The system-side block includes the system casing 17, a keyboard module 21 and the keyboard frame edge 19. The system casing 17 is made of a metal such as an aluminum alloy or a magnesium alloy, and accommodates therein system elements of the notebook-size PC 10, for example, a motherboard and a hard disk drive. The keyboard assembly 21 is attached to the surface of the system casing 17, and the keyboard frame edge 19 is arranged around the keyboard assembly 21 and fixed to the system casing 17 with screws. The keyboard frame edge 19 is formed of a plastic material. A broad area portion on the front side of the keyboard frame edge 19 functions as a palm rest for holding user's hands in a case where a user operates the keyboard. The keyboard frame edge 19 is provided with grooves 25a, 25b, 25c and 25d.

Then, the display casing 11 is attached to the system casing 17 via the hinges 15a, 15b. When the display-side block is closed, the projections 23a, 23b, 23c and 23d fit into the grooves 25a, 25b, 25c and 25d. The display casing 11 has to meet the requirements of an exterior cover in addition to the requirements of the structure. Therefore, the display casing 11 needs to be prepared so as to achieve not only strength but also a decorative function and a safe function. Therefore, to make a further compact and light casing structure, there is a restriction on the conventional structure in which the display casing 11 needs to satisfy two requirements including the strength and the function as the exterior cover as shown in FIGS. 6A, 6B.

Figure 7:
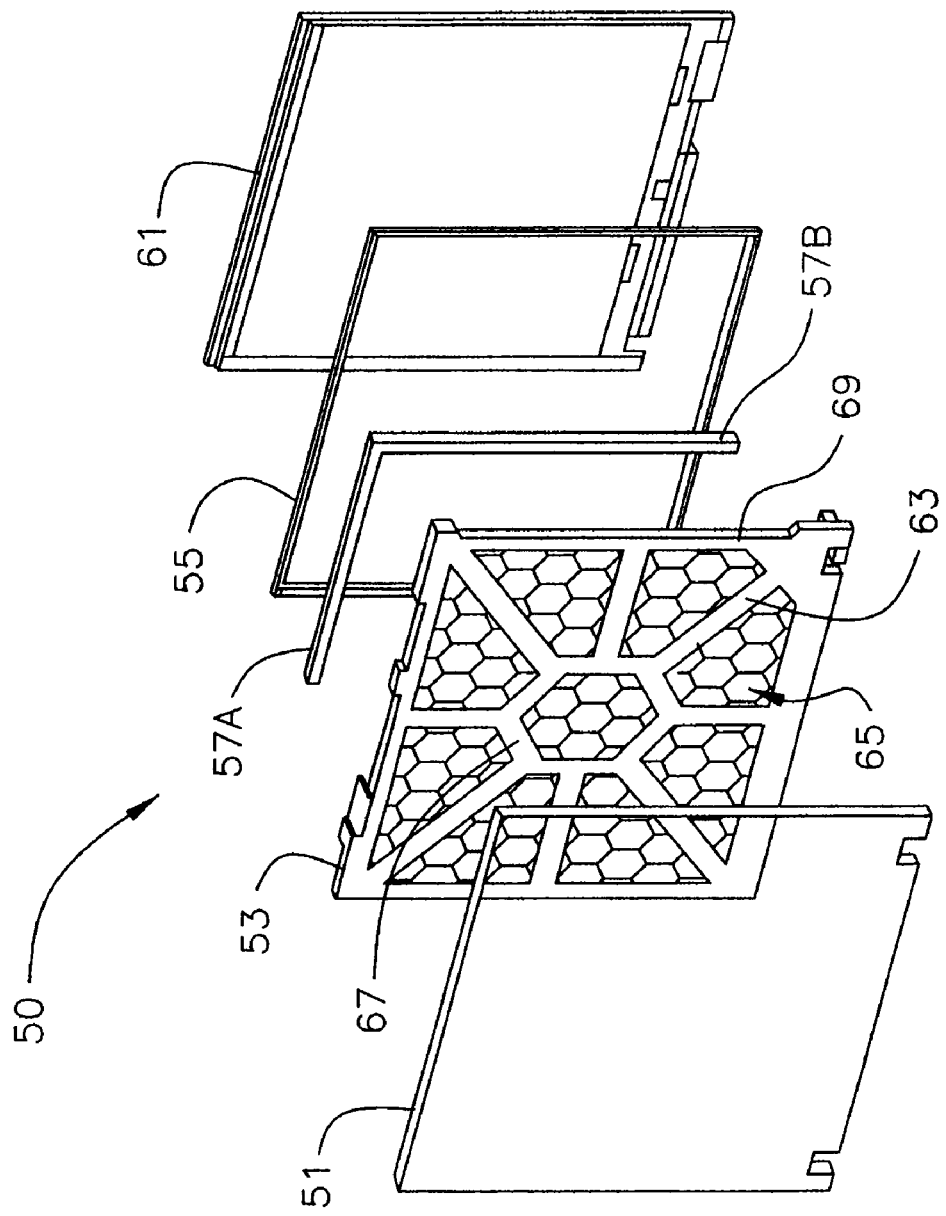
FIG. 7 is an explanatory view showing a structure of a conventional cage type display casing.

FIG. 7 is a schematic perspective view showing a constitution of a display-side block 50 as taught in Japanese Patent Application No. 2007-69947. The display-side block 50 can be attached to the system casing 17 of the notebook-size PC 10 via the hinges as described with reference to FIGS. 6A and 6B. The display-side block 50 is mainly constituted of a decorative cover 51, a cage type display casing 53, antennas 57a, 57b, a display module 55 and a display frame edge 61. In FIG. 7, to facilitate the understanding of the drawings, the decorative cover 51, the antennas 57a, 57b and the display module 55 are represented in a transparent manner, but do actually not have to be transparent in actuality. The decorative cover 51 forms the surface of the notebook-size PC 10 at a time when a lid of the notebook-size PC 10 is closed.

The decorative cover 51 is formed of a plastic material into a box shape, and is strengthened so that the thickness of a peripheral portion is about 1 mm, whereas the thickness of the center has a value of about 2 to 3 mm. The decorative cover 51 is constituted so that the cover can be attached to cage type display casing 53 by the user by a well known method such as a fitting structure, a latch structure or a screw method. Therefore, the user can change the decorative cover 51 through preference. Unlike the display casing 11 shown in FIG. 6A, the decorative cover 51 does not have such a strength as to hold the display module 12 or function as the structure of the notebook-size PC 10.

The cage type display casing 53 is the same as the display casing 11 shown in FIG. 6A in that the display module is held, but is different from the display casing in a required function and a structure. Hereinafter, in the present specification, the display casing 11 shown in FIG. 6A is referred to as the thin plate type display casing, and is distinguished from the cage type display casing. The cage type display casing 53 is integrally formed by die-casting of a light alloy such as the magnesium alloy or the aluminum alloy, and a lower part thereof is attached to the system casing 17 via the hinges. The cage type display casing 53 accommodates the display module 55, and performs a function of the structure of the display-side block 50. The display frame edge 61 is attached to the cage type display casing 53 with screws so as to cover the peripheries of the display module 55 and the cage type display casing 53.

The antenna 57a is attached to the side surface of the upside of the cage type display casing 53, and the antenna 57b is attached to the lateral side surface the cage type display casing 53. The antennas 57a, 57b are attached to the outside of the cage type display casing 53. Therefore, the cage type display casing 53 does not have to be partially cut as the structure for securing sensitivity. The antennas 57a, 57b are connected to a radio module in the system casing 17 via cables passing through cable ducts provided on the cage type display casing 53.

The cage type display casing 53 is formed into a box-like shape in a state in which the edge of a peripheral portion 69 having such a shape that an opening is formed on the inner side of a rectangular plate with a long side of about 30 cm and a short side of 25 cm is bent as much as about 6 to 7 mm so that the display module 55 can be received. Eight main bridges 63 extend from the peripheral portion 69 to the center. In the center, a hexagonal main bridge 67 is formed, and communicates with the eight main bridges extending from the peripheral portion 69.

Then, sub-bridges 65 having a honeycomb structure are formed in inner portions separated by the peripheral portion 69 and the eight main bridges 63 and an inner portion of the main bridge 67. The sub-bridges 65 communicate with the main bridges 63, 67 and the peripheral portion 69, and are provided so as to support the decorative cover 51 against the pressing force. In the display-side block 50 having such a structure, the cage type display casing 53 is externally covered with the decorative cover 51, so that the shape and the structure of the casing can be determined in consideration of a strong and light casing. Then, the decorative cover 51 is released from the requirement with respect to the strength, and can be formed as an outer cover into a structure specific for a purpose of securing the appearance of an outer shell or preventing the invasion of water droplets or dust. Even in this structure, the display frame edge 61 is provided with projections fitting into the grooves 25a to 25d of the system casing 17.

As noted above, in a case where the notebook-size PC 10 is received in a bag and carried in a state in which the display-side block is closed, or documents are piled up on the computer on a desk, pressure is sometimes applied to the center of the display casing 11 in a direction shown by an arrow A in FIG. 6B. In the state in which the display casing 11 is closed, the edge of the side wall is supported by the system casing 17 via the display frame edge 13 and the keyboard frame edge 19 against a pressing force in the direction of the arrow A. The force in the arrow A direction acts as a force for pushing and spreading the edge of the side wall of the display casing 11 in directions of arrows B, C and a direction of arrow D as a front direction of the display casing 11. It is to be noted that on the back surface side of the system casing 17, the side wall of the display casing 11 is fixed via the hinges, so that the side wall is not pushed or spread by the force in the arrow A direction.

At this time, the projections 23a, 23b, 23c and 23d formed on the display frame edge 13 fit in the grooves 25a, 25b, 25c and 25d, respectively, to inhibit the edge of the side wall of the display casing 11 from spreading externally against the forces in the directions of the arrows B, C and D. However, the display frame edge 13 is formed of the plastic material, and further if the display module 12 needs to be removed later, the display frame edge cannot be firmly and integrally connected to the display casing 11 by welding, an adhesive or the like. Similarly, the keyboard frame edge 19 may need to be removed to change the system elements. Therefore, the keyboard frame edge cannot be integrally connected to the system casing 17.

Moreover, assembly tolerance is required in the display frame edge 13, the display casing 11, the keyboard frame edge 19 and the system casing 17, and hence large grooves need to be formed as much as this tolerance so as to securely fit the projections 23a, 23b, 23c and 23d into the grooves 25a, 25b, 25c and 25d at a time when the display-side block is closed. Therefore, in the reinforcing structure of the display casing 11 constituted of the projections 23a, 23b, 23c and 23d formed in the display frame edge 13 and the grooves 25a, 25b, 25c and 25d formed in the keyboard frame edge 19, the spread of the side wall of the display casing 11 cannot sufficiently be suppressed by the heretofore described conventional arrangements.

As a result, the display casing 11 bends as much as the space L1 or more, when the back surface of the display casing 11 is pushed in the back surface direction of the display module 12, and the pushed surface of the display module 12 bends as much as the space L2 or more, sometimes comes in contact with the keyboard frame edge 19 and is damaged. In recent years, seeking the notebook-size PCs 10 that are compact and light, there has been a need for decreasing the spaces L1, L2 as much as possible, achieving the compact display casing 11. However, there is a restriction on the rigidity of this display casing 11 against an external force, in a case where the computer is made compact and light. Even in the cage type display casing 53 shown in FIG. 7, the projections are formed on the display frame edge and the grooves are formed in the keyboard frame edge to employ the same type reinforcing structure, and hence a similar problem is generated.

To solve the problem, the present invention provides a casing structure of an electronic apparatus that is compact and light. The present invention also provides a casing structure capable of protecting a display module against a pressing force from the outside while achieving a compact and light structure. The present invention furthermore provides a compact and light portable computer.

According to one embodiment of the present invention, a casing structure is provided having projections to reinforce a closed display casing, directly formed on the display casing. When the display casing is made of a metal, the projections can be formed integrally with the display casing by die-casting. A system casing is directly provided with grooves engaging with the projections of the closed display casing. When the system casing is made of a metal, the grooves can be formed integrally with the system casing by die-casting. It is to be noted that there is not any special restriction on the grooves as long as the grooves can engage with the projections. The grooves may have bottom surfaces, or may be through holes that do not have any bottom surface.

As discussed above, in a case where the projections and the grooves are formed on another component such as a display frame edge or a keyboard frame edge, when a pressing force is applied to the display casing, strain is easily generated in a joining portion between these components, and hence the spread of a side wall cannot sufficiently be prevented. However, according to one embodiment of the present invention, the projections and the grooves are formed in the display casing and the system casing, respectively, thereby obtaining a structure in which the spread of the side wall can securely be prevented to improve the rigidity against the pressing force. Moreover, assembly tolerance can be decreased, and hence play in the projections fitting into the grooves can be decreased.

According to one embodiment of the present invention, the display casing may be a thin plate type or a cage type. In the case of the cage type, a decorative cover that covers the display casing may be provided. When the frame edge with projections is provided on the edge of the side wall of the display casing, the edge can be further strengthened. The frame edge may be provided with an attachment surface, and a seal tape may be attached so as to straddle the attachment surface and a fixing frame of a display module. As a result, it can prevent dust, etc., entering a gap between the fixing frame and the inner surface of the side wall, and appearance can be kept. Moreover, the seal tape can easily be peeled, and hence the display module can be removed from the display casing later.

According to an embodiment of the present invention, the seal tape makes it possible that the projections can directly be formed on the display casing while preventing the invasion of dust and maintaining the appearance without using any conventional display frame edge. A support surface that comes in contact with the system casing when the display casing is closed may be formed on the frame edge. At this time, the seal tape may be attached so as to straddle the fixing frame of the display module, the inner surface of the side wall of the system casing and the support surface. It is to be noted that the system casing may be provided with projections, and the display casing may be provided with grooves engaging with the projections.

According to an embodiment of the present invention, there can be provided the casing structure of the electronic apparatus capable of making it compact and light. Furthermore, according to the present invention, there can be provided the casing structure capable of protecting the display module against a pressing force from the outside while making compact and light. Furthermore, according to the present invention, there can be provided a compact and light portable computer.

Figure 1A:
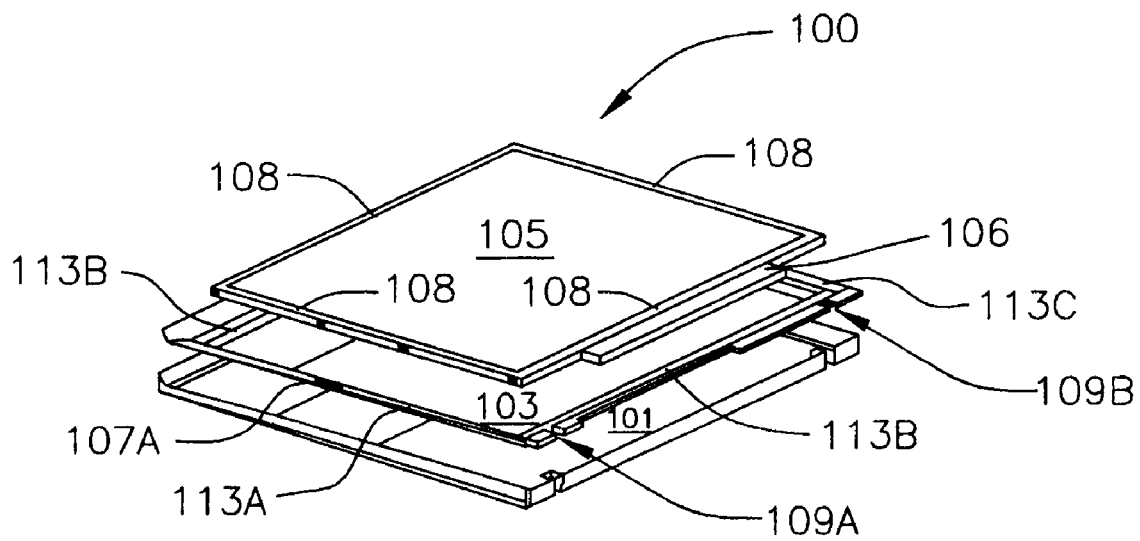
FIGS. 1A and 1B are explanatory views of a structure of a display-side block.
Figure 1B:
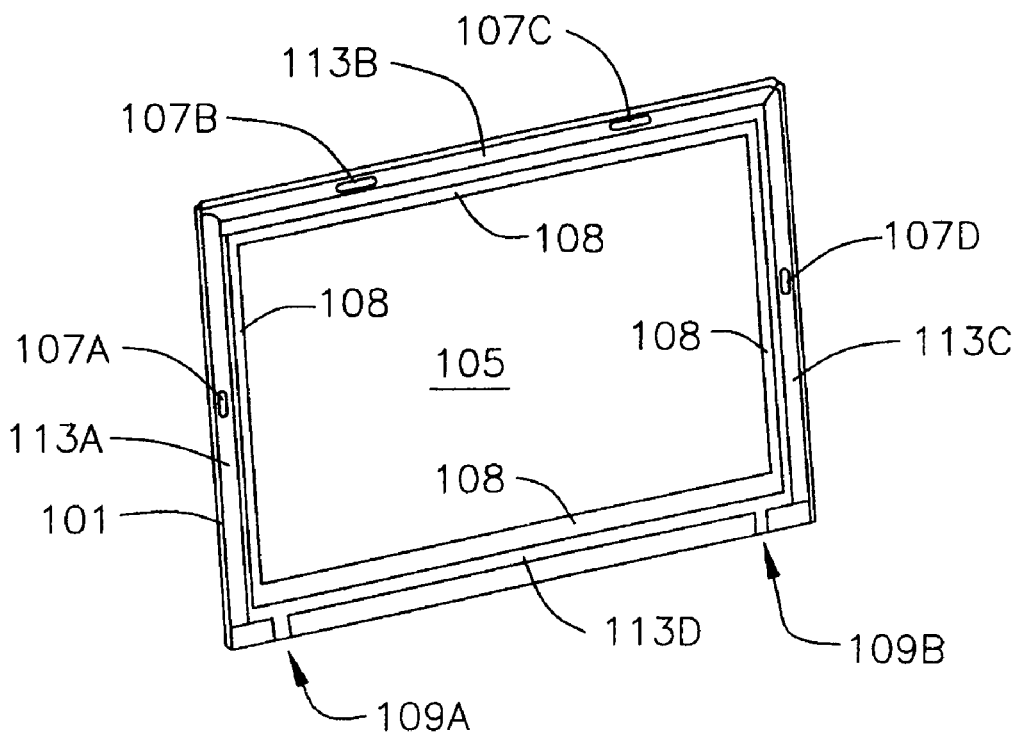

FIG. 1A is a disassembled perspective view of a display-side block 100 according to an embodiment of the present invention, and FIG. 1B is a perspective view showing an assembled state according to an embodiment of the present invention. It is to be noted that in the present specification, the same elements are denoted with the same reference numerals in the drawings. The display-side block 100 is constituted of a display module 105, a cage type display casing 103 and a decorative cover 101. The display module 105 is constituted of a liquid crystal display main body and a driving unit 106. As the display module 105, instead of a liquid crystal display, another type thin display such as a plasma display or an EL display may be employed. Four sides of the display module 105 are surrounded with a fixing frame 108.

The cage type display casing 103 is similar to that of the cage type display casing 53 described with reference to FIG. 7, and includes main bridges and sub-bridges. The cage type display casing 103 is different in that frame edges 113a, 113b, 113c and 113d having externally bent edges are formed and that the frame edges 113a, 113b, 113c and 113d are provided with projections 107a, 107b, 107c and 107d.

Furthermore, a keyboard frame edge provided with projections is used in the display-side block 50 of FIG. 7, but any keyboard frame edge is not used in the display-side block 100. The whole cage type display casing 103 including the frame edges and the projections is integrally formed by the die-casting of a light alloy such as an aluminum alloy or a magnesium alloy.

The structure and the advantage of the inventive display-side block 100 in which any keyboard frame edge is not used will be described later in detail. The display module 105 is received in the cage type display casing 103, and the fixing frame 108 is fixed to the side walls of the cage type display casing 103 with screws. The decorative cover 101 is formed of a plastic material. The decorative cover 101 has the same function and structure as those of the decorative cover 51 shown in FIG. 7. The decorative cover 101 is fixed to the cage type display casing 103. The display-side block 100 is attached to the system casing 150 shown in FIG. 3A via hinges (not shown) fixed to hinge attachment portions 109a, 109b of the cage type display casing 103.

Figure 2A:
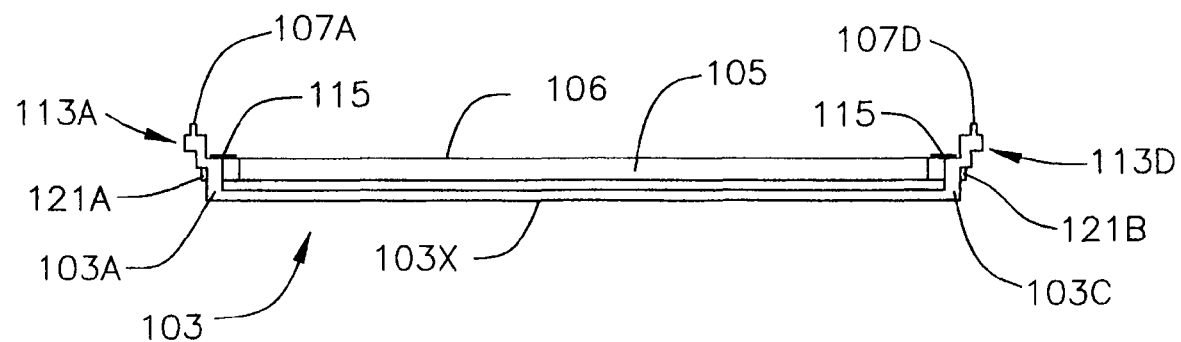
FIGS. 2A and 2B are explanatory views of a detailed structure of a frame edge.
Figure 2B:
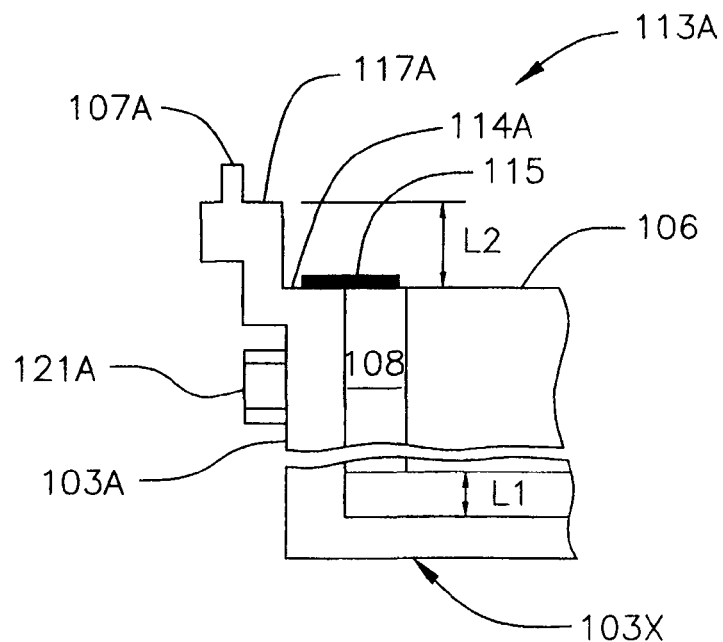

FIG. 2A shows a section in a state in which the display module 105 is fixed to the cage type display casing 103, and FIG. 2B is an enlarged view showing a section around the frame edge 113a. The cage type display casing 103 is formed into a box-like shape including a bottom portion 103x and side walls 103a, 103b, 103c and 103d, and the display module 105 received in the casing is fixed with screws 121a, 121b. In FIG. 2A, the side walls 103a, 103c only are shown, but the side walls 103b, 103d are formed in positions corresponding to the frame edges 113b, 113d.

The bottom portion 103x is constituted of main bridges, sub-bridges and a peripheral portion. FIG. 2B shows a state in which the fixing frame 108 of the display module 105 is fixed to the side wall 103a with the screw 121a. The frame edges 113a, 113b, 113c and 113d are formed on the edges of the side walls 103a, 103b, 103c and 103d, respectively. FIG. 2B shows a view around the frame edge 113a provided with the projection 107a. The projections 107b, 107c and 107d are similarly formed on the frame edges 113b, 113c.

No projection is formed on the frame edge 113d, because the hinge prevents the spread of the edge of the side wall against a pressing force applied to the cage type display casing 103. The frame edge 113a includes an attachment surface 114a and a support surface 117a, and the projection 107a projects from the support surface 117a. In a portion where the projections 107a, 107b, 107c and 107d are not present, the support surface is a flat surface.

When the display-side block 100 is closed, the support surface comes in contact with the edge of the side wall of the system casing 150 to transmit a pressing force (FIG. 6B) in an arrow A direction to a system casing. The support surface 117a is present in a position away from the surface 106 of the display module than from the attachment surface 114a. A space L2 is secured between the support surface 117a and the surface 106 of the display module. Moreover, a space L1 is secured between the inner surface of the bottom portion 103x of the cage type display casing and the back surface of the display module 105.

The frame edge 113a and the projection 107a are integrally formed as a part of the cage type display casing 103 by the die-casting of a light alloy. The display module 105 is attached to the side walls 103a, 103c of the cage type display casing with the screws 121a, 121b so that the surface of the fixing frame 108 of the display module is present on the same plane as the attachment surface 114a. Furthermore, a seal tape 115 is attached so as to straddle the attachment surface and the fixing frame 108, thereby covering gaps formed between the fixing frame 108 of the display module and the inner surfaces of the side walls 103a, 103b, 103c and 103d. The seal tape 115 is attached to the attachment surface and the whole periphery of the fixing frame 108 with an adhesive material with which one surface is coated so that the tape can be peeled later.

This seal tape 115 covers the gaps between the fixing frame 108 of the display module and the frame edges 113a, 113b, 113c and 113d. In consequence, according to the present embodiment, the externally projecting frame edges 113a, 113b and 113c can be provided on the edges of the side walls 103a, 103b and 103c to increase the rigidity of the cage type display casing 103. In addition, since the seal tape 115 can easily be peeled, the removing of the display module 105 is not disturbed later.

Figure 3A:
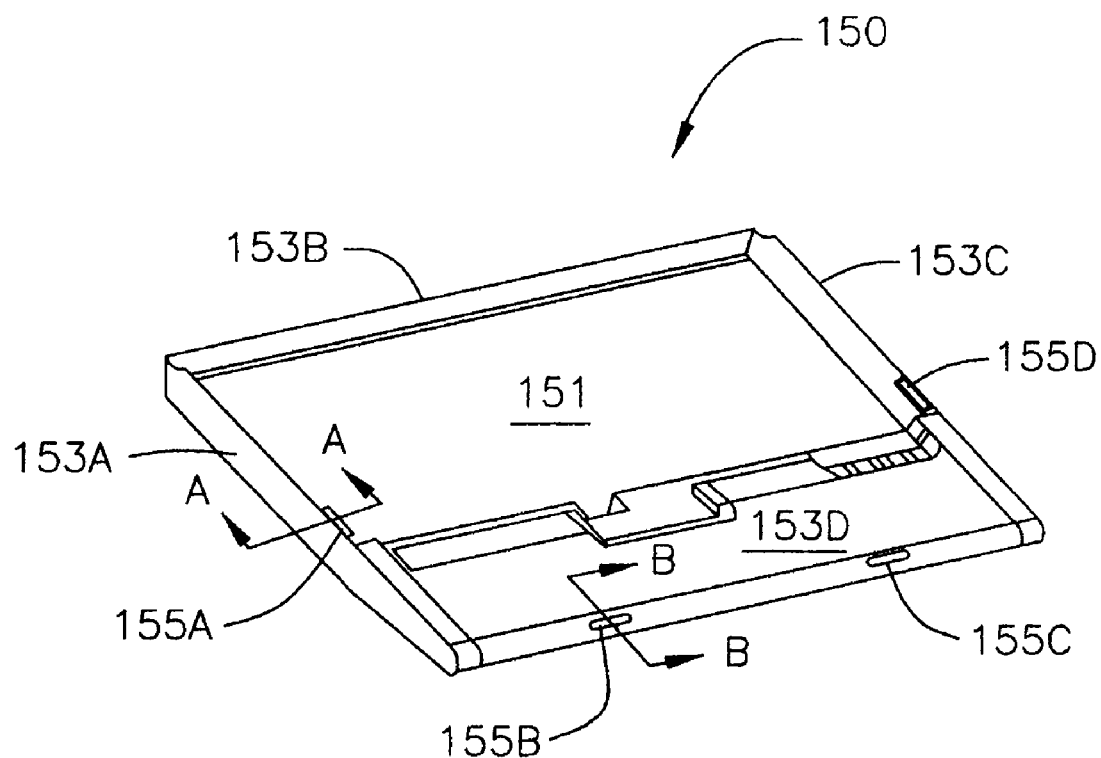
FIGS. 3A to 3C are explanatory views of a structure of a system casing.

FIG. 3A is a perspective view showing the outer shape of the system casing 150 that supports the display-side block 100 so as to be freely opened and closed. In the system casing 150, a bottom portion 151, side walls 153a, 153b and 153c and a palm rest portion 153d are integrally formed by the die-casting of a light alloy such as an aluminum alloy or a magnesium alloy. In an inner space surrounded with the bottom portion 151, the side walls 153a, 153b and 153c and the palm rest portion 153d, system elements (not shown) such as a mother board, a hard disk drive and a radio module of a notebook-size PC are received.

Figure 3B:
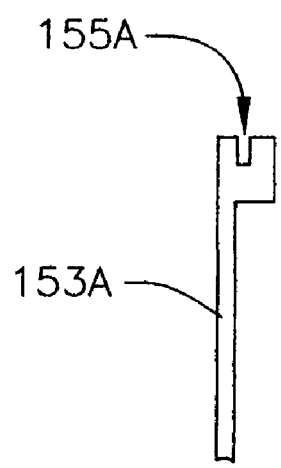
Figure 3C:
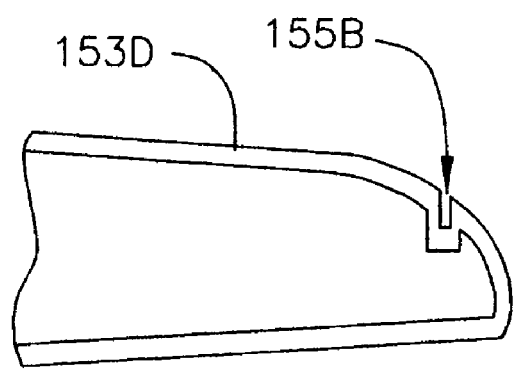

The display-side block 100 is fixed to the side wall 153b with hinges. Furthermore, along the extension of the surface of the palm rest portion 153d or in an open portion of the system casing 150, a keyboard assembly (not shown) arranged in a configuration shown in FIG. 6A is fixed to the bottom portion 151 or the mother board. The side walls 153a, 153c are provided with provided with grooves 155a, 155d, and the palm rest portion 153d is provided with grooves 155b, 155c. An enlarged view of a section (cut along the arrows A-A) of the groove 155a is shown in FIG. 3B, and an enlarged view of a section (cut along the arrows B-B) of the groove 155b is shown in FIG. 3C. The grooves 155a, 155b, 155c and 155d is formed as a part of the system casing 150 by die-casting.

Figure 4:
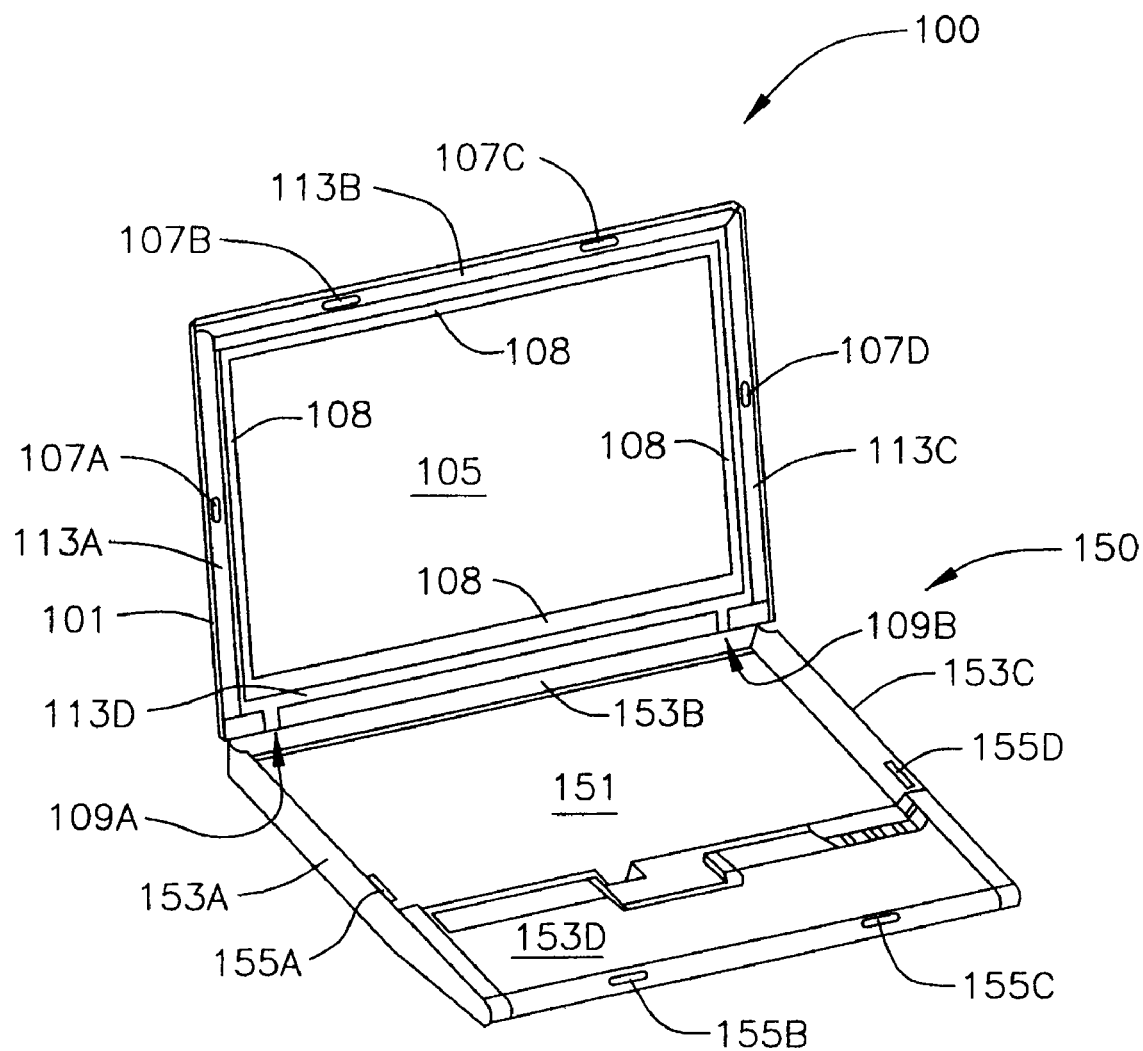
FIG. 4 is a perspective view showing that the display-side block is combined with the system casing.

Next, a state in which the display-side block 100 is attached to the system casing 150 with hinges will be described. FIG. 4 is a perspective view showing a state in which the display-side block 100 is attached to the system casing 150 of FIG. 3A with hinges in the hinge attachment portions 109a, 109b so as to be freely opened and closed. As described above, in the display-side block 100, the display frame edge 61 provided with the projections shown in FIG. 7 is not present in the display-side block 100. When the display-side block 100 is closed, the support surfaces formed on the frame edges 113a, 113b and 113c come in contact with the edges of the side walls 153a, 153b and 153c of the system casing, and the projections 107a, 107b, 107c and 107d fit into the grooves 155a, 155b, 155c and 155d, respectively. At this time, the support surface maintains a space close to the space L2 shown in FIG. 2B between the surface 106 of the display module and the palm rest portion 153d.

Then, in a state in which the display-side block 100 is closed, when a force in an arrow A direction is applied to the decorative cover 101 as shown in FIG. 6B, the edges of the side walls 103a, 103b and 103c hardly spread in the directions of arrows B, C and D, because the projections 107a, 107b, 107c and 107d are formed integrally with the cage type display casing 103. Therefore, the rigidity of the bottom portion 103x of the cage type display casing 103 against the pressing force in the arrow A direction is increased, and it can be prevented that the bottom portion 103x bends in excess of the space L1. Even when the cage type display casing 103 bends in excess of the space L1, a space close to the space L2 is secured, and hence the surface 106 of the display module does not come in contact with the system casing 150 and is not damaged.

Furthermore, the frame edges 113a, 113b and 113c reinforce the edges of the side walls 103a, 103b and 103c, and further increase the rigidity of the cage type display casing 103. Such a structure can be realized, because the projection is directly formed on the cage type display casing 103 without forming any projection on the display frame edge 61 employed in a conventional casing structure. Then, the gap between the fixing frame 108 of the display module and the inner surface of the side wall is closed with the seal tape, whereby the display module can be removed later. The grooves 155a, 155b, 155c and 155d of the system casing 150 are also integrally formed with the system casing 150. Therefore, when the force in the arrow A direction is applied to the cage type display casing 103, the casing firmly resist the forces in the directions of the arrows B, C and D, and it is prevented that the edges of the side walls 103a, 103b and 103c spread externally.

Figure 5A:
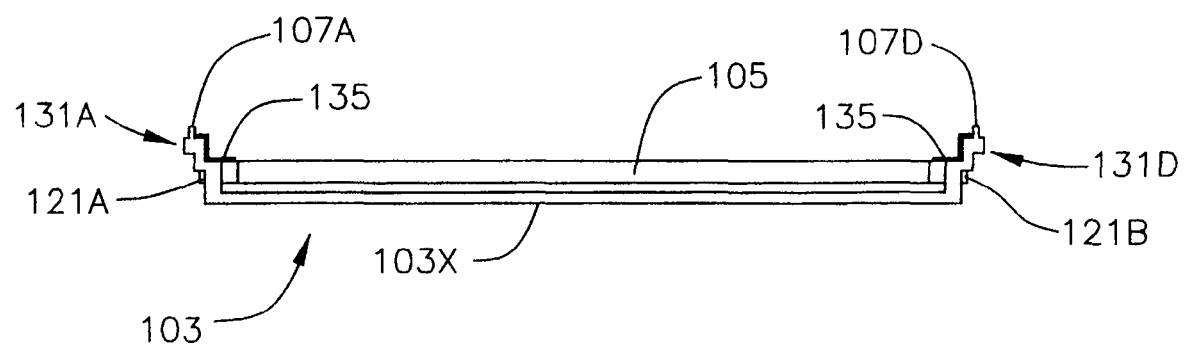
FIGS. 5A and 5B are explanatory views of another structure of a frame edge.
Figure 5B:
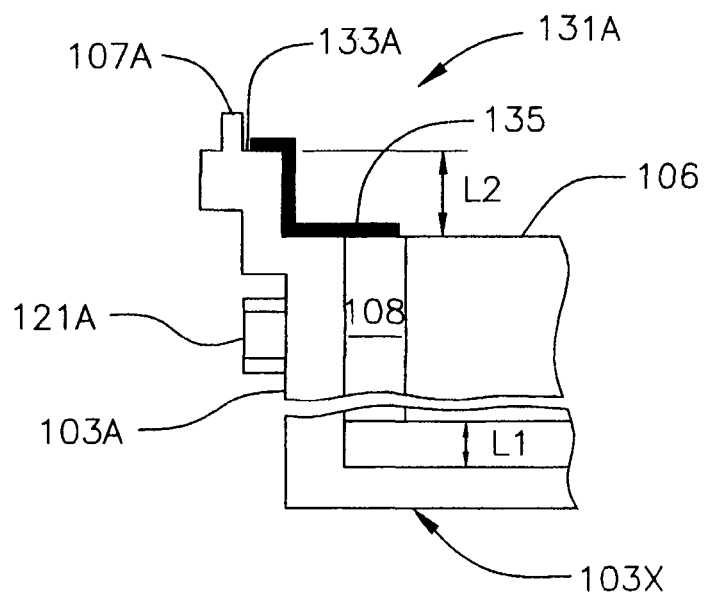

FIGS. 5A and 5B are diagrams showing another embodiment of the cage type display casing 103. FIG. 5A shows a section in a state in which a display module 105 is fixed to the cage type display casing 103, and FIG. 5B is an enlarged view showing a section around a frame edge 131a provided with a projection 107a. The frame edge 131a is provided with a support surface 133a, and the projection 107a projects from the support surface 133a. A surface 106 of the display module is fixed to side walls 103a, 103c with screws 121a, 121b so as to secure a space L2 between the surface and the support surface 133a.

When the display-side block is closed, the support surface comes in contact with the edge of the side wall of the system casing. Then, a seal tape 135 having a section formed into a crank-like shape is attached to a fixing frame 108 of the display module, the inner surface of the side wall 103a and the support surface 133a. Another frame edge such as a frame edge 131d has a similar structure. The shape of the frame edge 131a is simpler than that of the frame edge 113a shown in FIGS. 2A and 2B, whereby the preparation of a cage type display casing is facilitated.

Figure 8A:
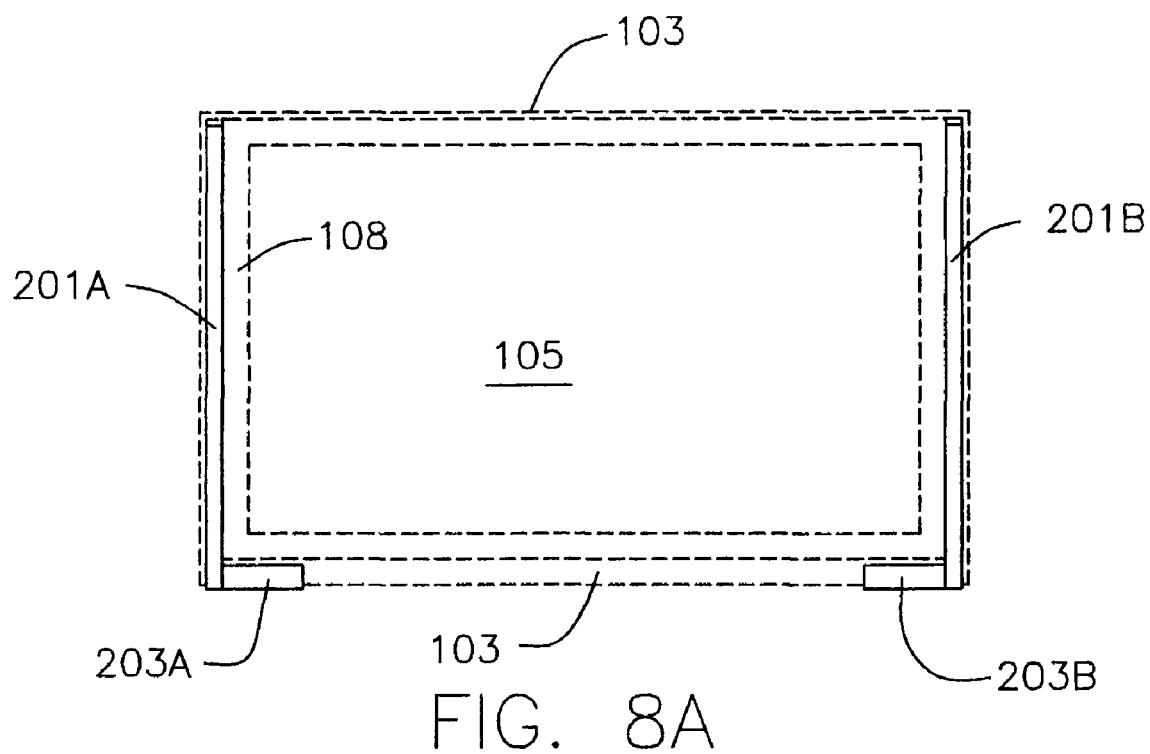
FIGS. 8A and 8B are explanatory views showing another structure of the display-side block.
Figure 8B:
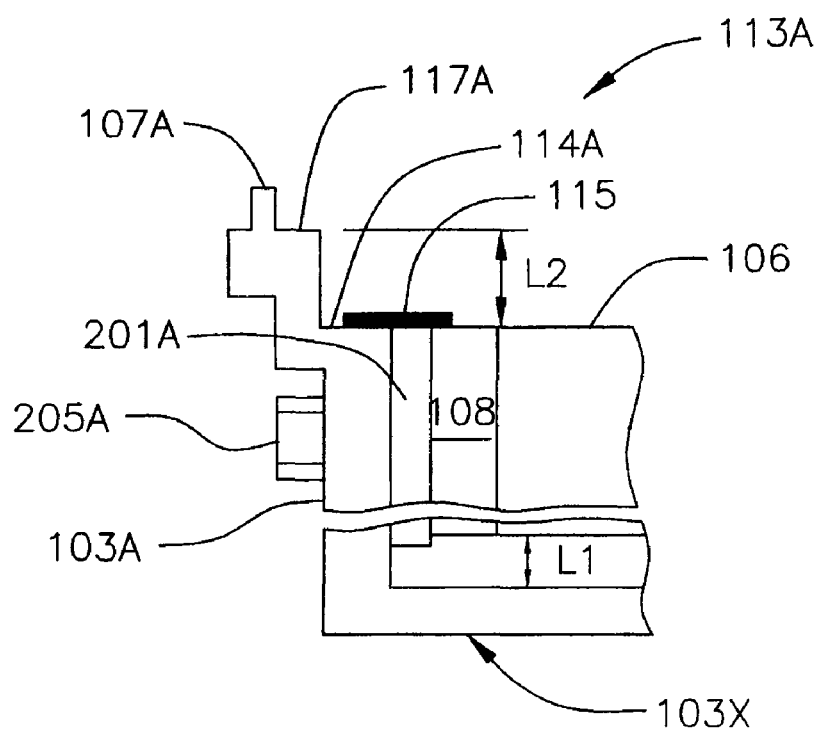

FIGS. 8A and 8B are explanatory views of a structure according to another embodiment of the display-side block. In the display-side block 100 described with reference to FIGS. 1, 2, the display module 105 is directly fixed to the side walls 103a, 103c of the cage type display casing 103 with screws. In this case, assembly tolerance allowed between the fixing frame 108 of the display module 105 and the inner surface of the side wall of the cage type display casing 103 becomes comparatively strict.

In a structure of a display-side block 200 shown in FIG. 8A, the display module 105 of the display-side block 100 is not attached to the cage type display casing 103, and is attached to a pair of hinge brackets 201a, 201b. The hinge brackets 201a, 201b are provided with arm portions 203a, 203b to be attached to hinges of the side wall 153b (FIG. 3A) of the system casing 150 so as to be freely opened and closed, respectively. Then, side walls 103a, 103c of a cage type display casing 103 are fixed to the hinge brackets 201a, 201b with screws. Furthermore, a decorative cover 101 is attached to the cage type display casing 103 in the same manner as in FIGS. 1A and 1B.

The hinge brackets 201a, 201b are formed of a stainless steel having a thickness of about 0.8 mm or an equivalent metal. The hinge brackets 201a, 201b slightly project toward the display module 105 (inwardly) in the center of a longitudinal direction, and projected portions have elasticity. Therefore, even when a slight preparation error is generated in the outer dimension of the display module 105, the display module can be adapted to a space between the hinge brackets 201a and 201b and fixed to owing to the projection and the elasticity of the hinge brackets. FIG. 8B is a sectional view corresponding to FIG. 2B, and shows the hinge bracket 201a arranged between a fixing frame 108 and the side wall 103a. The cage type display casing 103 is attached to the hinge bracket 201a with a screw 205a. Another structure is the same as that of FIG. 2B. It is to be noted that in this structure, the projections 107a, 107d shown in FIG. 1A may be formed on the hinge brackets 201a, 201b.

A present embodiment has been described above in accordance with the example of the cage type display casing, but the present invention may be applied to a thin plate type display casing shown in FIGS. 6A and 6B. In this case, an element corresponding to the decorative cover 101 is not used in the display-side block. Moreover, the casing structure in which any display frame edge is not used has been described. However, when the projection can be directly formed on the display casing, the use of the display frame edge is not excluded in the present invention.

Figure 9:
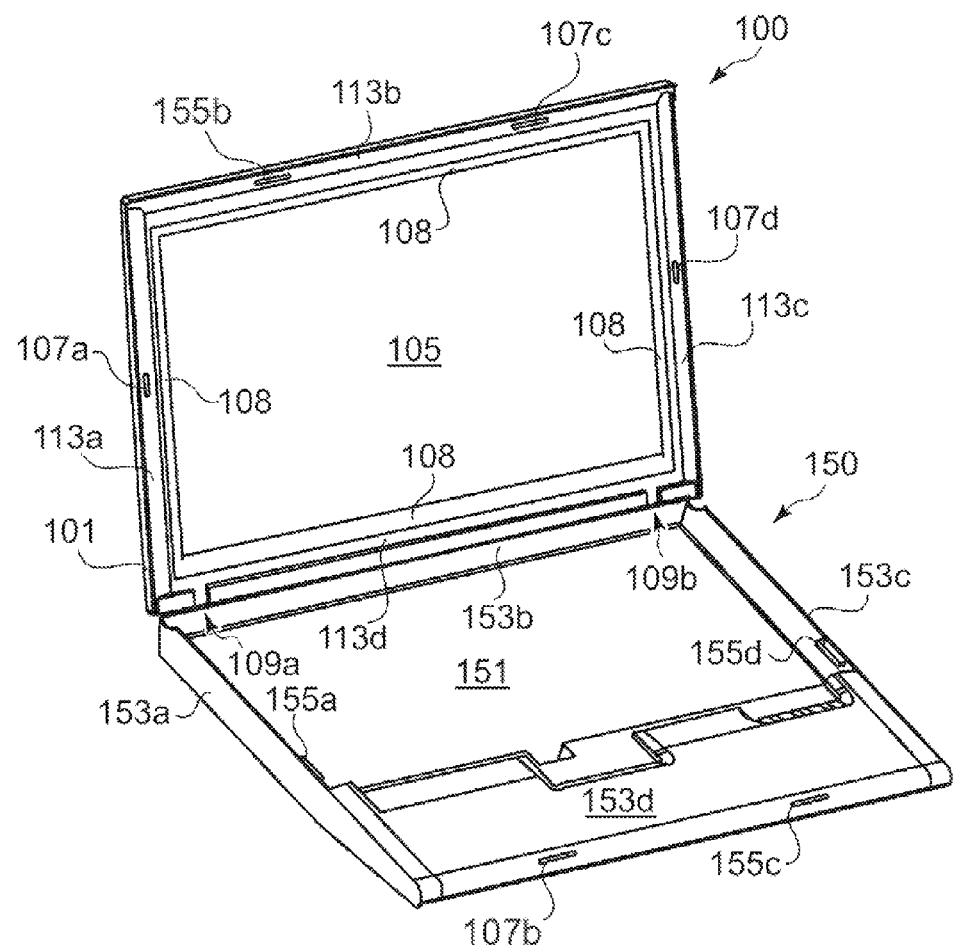
FIG. 9 is an explanatory view of a detailed structure of a system casing and a display casing.

In the above embodiments, an example in which the display casing is provided with the projections and the system casing is provided with the grooves has been described. However, in the present invention, the display casing may be provided with grooves, and the system casing may be provided with the projections fitting into the grooves. Alternatively, referring generally to FIG. 9 in which elements 107*b* and 155*b* of FIG. 4 have been switched from the display casing to the system casing, and from the system casing to the display casing, respectively, one of the display casing and the system casing may be provided with a projection and a groove, and the other casing may be provided with a groove and a projection engaging with the projection and the groove of the one casing.

The present invention has been described above in accordance with the specific embodiment shown in the drawings, but the present invention is not limited to the embodiment shown in the drawings, and needless to say, the present invention can be employed in any known constitution as long as the effect of the present invention is produced.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The invention claimed is:

1. An apparatus comprising:
a display casing having an attachment surface, bent edges extended from said from said attachment surface, said bent edges including a support surface and at least one integral projection formed on said bent edges of the display casing; and
a system casing having at least one integral groove therein that engages with the at least one integral projection of the display casing upon said display casing being placed in a closed position.

2. The apparatus according to claim 1, wherein the display casing is a thin-plate type display casing.

3. The apparatus according to claim 1, wherein the display casing is a cage type display casing.

4. The apparatus according to claim 3, wherein the display casing accommodates a removable decorative cover of the cage type display casing.

5. The apparatus according to claim 1, wherein the display casing and the system casing are made of a metal alloy and the at least one integral projection is formed integrally with the display casing by die-casting.

6. The apparatus according to claim 1, wherein the display casing and the system casing are die-cast from a metal alloy selected from the group of metal alloys consisting essentially of aluminum alloy and magnesium alloy; and wherein the display casing and the system casing are rigid so as to resist flexing that causes damage to a display housed within the display casing upon the display casing being placed in a closed position.

7. The apparatus according to claim 6, wherein the support surface contacts the system casing upon the display casing being placed in a closed position.

8. An apparatus comprising:
a system casing having at least one integral projection formed on an edge of the system casing; and
a display casing having an attachment surface, bent edges extended from said from said attachment surface, said bent edges including a support surface and at least one integral groove therein formed in said bent edges that engages with the at least one integral projection of the system casing upon said display casing being placed in a closed position.

9. The apparatus according to claim 8 wherein the display casing is adapted to accommodate a display.

10. The apparatus according to claim 8, wherein the display casing is a thin-plate type display casing.

11. The apparatus according to claim 8, wherein the display casing is a cage type display casing.

12. The apparatus according to claim 11, wherein the display casing accommodates a removable decorative cover of the cage type display casing.

13. The apparatus according to claim 8, wherein the display casing and the system casing are made of a metal alloy and the at least one integral projection is formed integrally with the system casing by die-casting.

14. The apparatus according to claim 13, wherein the display casing and the system casing are die-cast from a metal alloy selected from the group of metal alloys consisting essentially of aluminum alloy and magnesium alloy; and wherein the display casing and the system casing are rigid so as to resist flexing that causes damage to a display housed within the display casing upon the display casing being placed in a closed position.

15. The apparatus according to claim 13, wherein the support surface contacts the system casing upon the display casing being placed in a closed position.

16. An apparatus comprising:
a display casing comprising a continuous structure protecting a display panel and defining a first space between said display panel and said display casing, the display casing having an attachment surface, bent edges extended from said from said attachment surface, said bent edges including a support surface and comprising one or more of:
one or more projections integrally formed on said bent edges of said display casing; and
one or more integral grooves formed in bent edges of said display casing; and
a system casing housing one or more system components and comprising one or more of:
one or more projections formed on said system casing; and
one or more grooves formed in said system casing;
wherein said display casing defines a second space between said display panel and said system casing in a closed position.

17. The apparatus according to claim 16, wherein the display casing is made of a metal alloy and the at least one of at least one integral projection and at least one integral groove is formed integrally with the display casing by die-casting.

18. The apparatus according to claim 16, wherein the display casing is a cage type display casing.

19. The apparatus according to claim 18, wherein the display casing accommodates a removable decorative cover.

20. The apparatus according to claim 16, wherein the display casing further comprises one or more hinge brackets having one or more arm portions attachable to said system casing.

* * * * *